US006607016B2

(12) United States Patent
Jones (10) Patent No.: US 6,607,016 B2
(45) Date of Patent: Aug. 19, 2003

(54) JIG FOR HAND CUTTING DOVETAIL JOINTS

(75) Inventor: Steve K. Jones, Nepean (CA)

(73) Assignee: Lee Valley Tools, Ltd., Ottawa (CA)

(*) Notice: Subject to any disclaimer, the term of this patent is extended or adjusted under 35 U.S.C. 154(b) by 93 days.

(21) Appl. No.: 09/943,743

(22) Filed: Aug. 31, 2001

(65) Prior Publication Data

US 2003/0041709 A1 Mar. 6, 2003

(51) Int. Cl.$^7$ .............................. B27M 3/00; B27C 5/00
(52) U.S. Cl. ............................ 144/372; 83/13; 83/761; 83/821; 144/85; 144/144.1; 144/329
(58) Field of Search .......................... 83/761, 581, 821, 83/746, 13; 144/85, 88, 144.1, 137, 363, 371, 372, 329; 33/197, 628; 269/87.2, 87.3

(56) References Cited

U.S. PATENT DOCUMENTS

| | | | |
|---|---|---|---|
| 3,695,318 A | * | 10/1972 | Maury ........................ 144/35.1 |
| 3,861,665 A | * | 1/1975 | Wynn ........................ 269/87.2 |
| 4,462,440 A | | 7/1984 | Dolfi |
| 4,632,159 A | | 12/1986 | Glasgo |

OTHER PUBLICATIONS

"Dovetail Jig", Popular Woodworking, Dec. 2000, No. 19, p. 47–49.
"Methods of Work", Fine Woodworking, Feb. 2001 No. 147.
JM–1 Jointmaker, Bridge City Tool Works Catalog, p. 5.
"Making Hand–Cut Dovetails", American Country Furniture, Nick Engler and Mary Jane Favorite, p. 112–115.

* cited by examiner

Primary Examiner—W. Donald Bray
(74) Attorney, Agent, or Firm—John S. Pratt; Kilpatrick Stockton LLP (57) ABSTRACT

A jig having a guide block and a repositionable clamp for use with a saw for hand cutting tails and pins on the ends of boards to form a dovetail joint. The guide block has four planar sides that are joined to form a substantially square tube, the ends of which define guide faces that form an oblique angle with any plane orthogonal to the planar side of the guide block. A pair of magnets within the body of the guide block, each covered by a low friction pad firmly engage the saw and keep it in contact with the guide faces throughout the cutting operation. The guide block also has two orthogonal wing surfaces for positioning the guide block against a face of a board to orient the guide faces either: (a) square to the end of the board and at an angle to its faces, or (b) square to its faces and at an angle to the end of the board. The repositionable clamp is secured to the guide block for clamping it to the board in either of the two alternative positions.

40 Claims, 6 Drawing Sheets

JIG FOR HAND CUTTING DOVETAIL JOINTS

TECHNICAL FIELD

This invention relates generally to a jig for cutting interlocking joints, and more particularly relates to a jig for use with a hand saw for making hand-cut tails and pins to form a dovetail joint.

BACKGROUND OF THE INVENTION

Dovetail joints are considered to be the hallmark of a master woodworker who has acquired a significant level of skill. Dovetail joints are also a mark of quality and attention to detail that many people look for in high-quality furniture. This is because a dovetail joint requires very accurate and consistent workmanship in order to fit together properly. However, creating tight-fitting, accurate dovetail joints requires skill and patience sometimes beyond the amateur woodworker. The greatest difficulty in cutting dovetails is making the initial cuts in the pin and tails at the correct locations and at matching angles.

Numerous jigs have been devised to aid woodworkers in making hand-cut dovetail joints. Many of these dovetail jigs have been made completely of wood by woodworkers themselves. For example, a popular "homemade" dovetail jig typically consists of a several blocks of wood glued together with at least one edge cut at a predetermined angle. These wooden jigs are mainly used as marking gauges to lay out the dovetail joint but can be used to guide a saw. The jig is positioned in a first orientation on the board and used to guide the saw to make cuts for the tails. Next, the jig is positioned in a second orientation on a mating board and used to guide the saw to cut the pins. Although, jigs make it easier for the average woodworker to make accurate cuts when cutting hand-made dovetails, such homemade jigs have several limitations. One limitation of these wooden jigs is that the woodworker has to manually insure that the saw remains in contact with the guide face. Because these jigs have no mechanism to hold the saw against the guide face, it is very easy for the saw to "wander" from the guide block, especially when cutting dovetails in hardwoods. Any wander by the saw from the guide block reduces the accuracy of the cuts, which at a minimum, requires additional time and effort to obtain a properly fitting joint. Another limitation of these jigs is that the entire guide surface contacts the saw blade. This results in significant damage to the guide face from the saw teeth. Therefore, as the guide face becomes damaged, the accuracy of the cuts, and the quality of the dovetail joint decreases significantly. Furthermore, because the saw teeth contact the guide face, the saw is subject to additional wear, which prevents the saw from making a clean cut.

One effort to overcome the limitations of the homemade jig uses wooden guide faces positioned above the edge of the workpiece. This prevents the saw teeth from rubbing the guide face. This approach, however, does not secure the saw blade flush against the guide face during the entire cut.

Thus, there is a need for a jig for use in hand cutting dovetail joints that automatically engages the saw blade and ensures that the saw blade remains properly positioned during the cut, preferably while facilitating saw movement.

SUMMARY OF THE INVENTION

This invention is a jig having a guide block and a repositionable clamp for use with a saw for hand cutting tails and pins on the ends of mating boards to form a dovetail joint. The guide block provides two guide faces and two orthogonal wing surfaces for positioning against a face and end of a board to orient the guide faces either: (a) square to the end of the board and at an angle to its faces for cutting the tails, or (b) square to the faces of the board and at an angle to the end of the board for cutting the pins. This invention improves prior dovetail guide block designs by providing a pair of magnets within the body of the guide block, each of which are covered by a low friction pad. The magnet underlies the low-friction pad and firmly engages the saw to keep it in contact with the guide face throughout the cutting operation. The repositionable clamp may be attached to the guide block for clamping it to the board in either of the two alternative positions.

Both the guide block and repositionable clamp may be made from segments of extruded aluminum. In one embodiment, the guide block body extrusion has four generally planar sides, which are joined to form a tube having a substantially square cross section. The guide block also contains a pair of substantially orthogonal planar surfaces, or "wings," oriented parallel to two adjacent sides of the guide block and connected at one corner for supporting the guide block on the end of the workpiece. The extruded body also includes a generally round channel positioned inside the square tubular guide block adjacent to the reference wing-bearing corner for receiving a pair of disk-shaped magnets.

A recess is milled into each reference face of the guide block to receive one of the low-friction pads. The depth and position of the recessed channel is such that the low friction pads extend past the guide face by a distance equal to or slightly more than the tooth set of the saw to be used. This offset insures that the saw is placed in a repeatable cutting location with respect to the guide block and also prevents the saw blade from damaging either the low-friction pads and the guide block.

The invention also includes a method of hand cutting the tails and pins of a dovetail joint using a guide block having at least one angled guide face and having a magnet embedded in the plane of the tapered guide face and covered by low friction pad to ensure that the saw slides smoothly across the guide face. The method begins by first laying out a series of tails and pins in the tailboard and pinboard, respectively. Next, the guide block is oriented in a first position on the tailboard, such that the guide face forms an angle with the end of the tailboard. The guide block is placed on the tailboard so that the guide face is resting on the first tail line. This ensures that the friction pad is positioned on the waste side of the tail line. The saw is then placed against the friction pad such that the teeth are positioned below the friction pad and the saw is fully engaged by the magnet. The tail is cut by sawing down to the depth line. The procedure is then repeated for each addition tail. Next, the guide block is positioned in a second orientation on the pinboard such that the guide face is square to the end of the pinboard and forms an angle with the faces of the pinboard. The saw is then positioned against the low friction pad and engaged by the magnet in the guide face, which insures that the saw is fully engaged with the guide face during the entire cut. The procedure is then repeated for the remaining pins.

DETAILED DESCRIPTION

Figure 1:
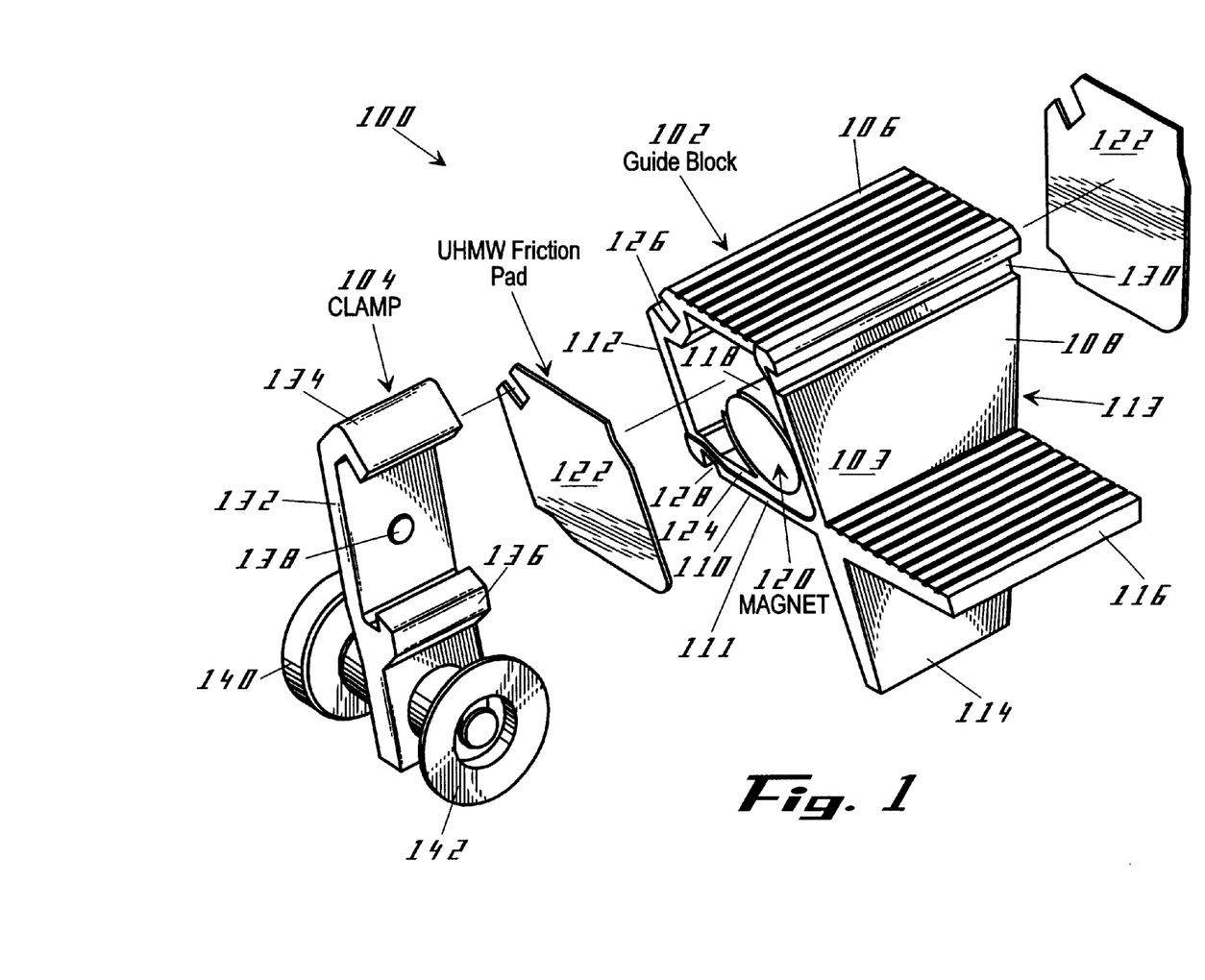
FIG. 1 is an exploded perspective view of one embodiment of the jig.

FIG. 1 is an illustration of an exploded perspective view of a jig 100, which includes a guide block 102 and a repositionable clamp 104. The illustrated guide block 102 is made from a section of extruded aluminum, or plastic, or other suitable materials, including composites, such as pultruded fiberglass-reinforced plastics. The guide block 102 consists of a guide body 103 having four planar sides, namely a top side 106, a front side 108, a bottom side 110, and a back side 112. The four planar sides join to form a tube having a substantially square cross section, the ends of which define guide faces 111 and 113. The guide block 102 also contains a pair of substantially orthogonal reference wings 114 and 116 extending from the bottom planar side 110 and the front side 108 and connected at the corner adjacent between the bottom planar side 110 and the front planar side 108. The substantially orthogonal reference wings 114 and 116 support the guide block 102 on the end of a board when cutting both the tails and pins of a dovetail joint.

The top side 106 of the guide block 102 is typically longer than the bottom side 110 so that guide faces 111 and 113 form an oblique angle with any plane orthogonal to the plane of the bottom side 110. Typically, the oblique angle selected is either 9 degrees (1:6 ratio) for cutting dovetails in softwoods, or 7 degrees (1:8 ratio) for cutting dovetails in hardwoods. Additionally, the predetermined angle may be set at any angle used for cutting dovetail joints, such as 10 degrees or 14 degrees. Although the predetermined angle of the jig 100 has been described in terms of common angles for dovetail joints, those skilled in the art will appreciated that the predetermined angle may be set to any useful angle. For example, the predetermined angle may be set 45 degrees for use in making miter cuts, or zero degrees for making square cuts.

Wings 114 and 116 are used to orient the guide block 102 against the end and adjoining face of a board in one of two orientations with: (1) the guide faces 111 and 113 are square to the board end and at an angle to its faces for cutting the tails; or (2) the guide faces 111 and 113 are square to the faces of the board at an angle to its end for cutting the pins of the dovetail joint.

The guide block 102 also contains an arcuate channel, preferably adjacent to the wing-bearing corner and extending the length of the guide block 102. The arcuate channel 118 is counterbored to receive a disk-shaped magnet 120 at each end of the guide block 102. The magnets 120 are typically held within the counterbore of the arcuate channel 118 by an adhesive, such as cyanoacrylate or epoxy. Alternatively, the magnets may be force fit mounted into the arcuate-shaped channel 118. The magnets 120 are positioned within the arcuate channel 118 such that the magnets 120 are flush or lie slightly below the level of the milled recess. This ensures that the magnets 120 fully engage the saw when it is placed proximate to the guide face 111 or 113 so that the saw remains in constant contact with the guide face 111 or 113 throughout the cutting process.

A low-friction pad 122 on each end of the guide block 102 ensures that the saw will glide smoothly during the cutting process. The low-friction pad 122 is typically constructed of ultra high molecular weight ("UHMW") polyethylene, which is a tough, dense polymer with self-lubricating properties. Alternatively, any polymer that exhibits low friction properties, such as polytetrafluoroethylene, sometimes sold under the trademark Teflon®, and the like may be used for the low-friction pads 122.

The low friction pads 122 are mounted in a recess 124, which is machined into the edges of the four sides 106, 108, 110, and 112, and are secured to the guide block 102 using an adhesive material, such an acrylic-based adhesive, cyanoacrylate, epoxy, or any other appropriate adhesive material. The depth of the recess 124 is such that the low-friction pads 122 stand proud of the guide faces 111 and 113 by a predetermined amount equal to or slightly greater than the tooth set of the saw. Typically, the low-friction pads 122 stand proud of the guide face 111 or 113 by 0.005 inches to allow a fine tooth saw, such as a Dozuki-style saw having a 0.005 inch tooth set, to be used with the guide block 102. Because the low-friction pads 122 stands proud of the guide faces 111 and 113 the same distance that the teeth of the dovetail saw are offset, the teeth of the blade will exactly line up with the layout lines, which is necessary to create accurate, clean cuts. Additionally, because the low-friction pads 122 are positioned on the guide faces 111 and 113 in the recess 124, the edges of the low-friction pads 122 do not reach the edges of the guide block 104. This reduces contact between the teeth of the saw and the low-friction pads 122 and between saw blade and the guide block 102.

Figure 2:
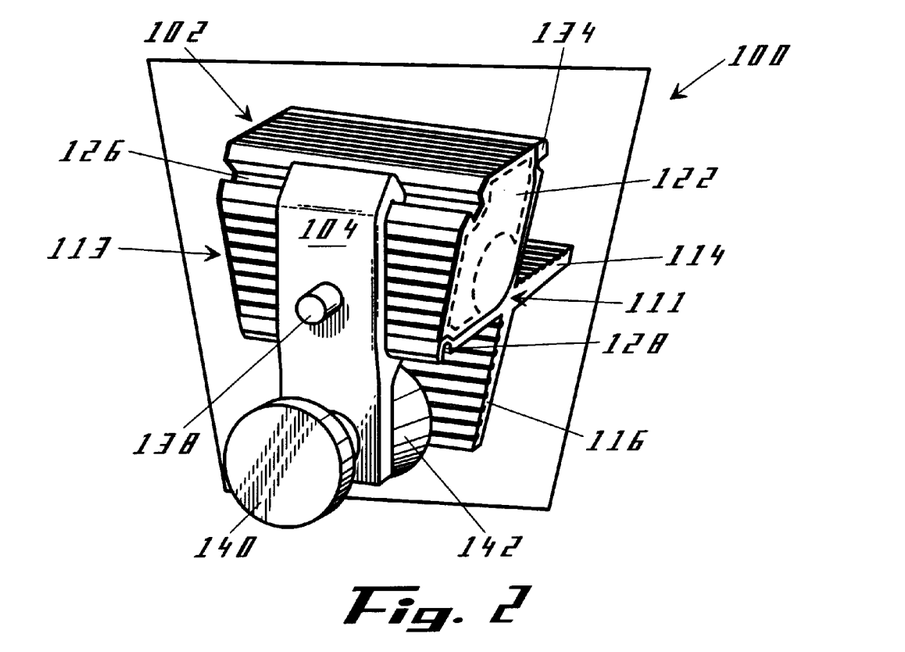
FIG. 2 is a perspective view of the jig oriented for cutting tails.
Figure 4:
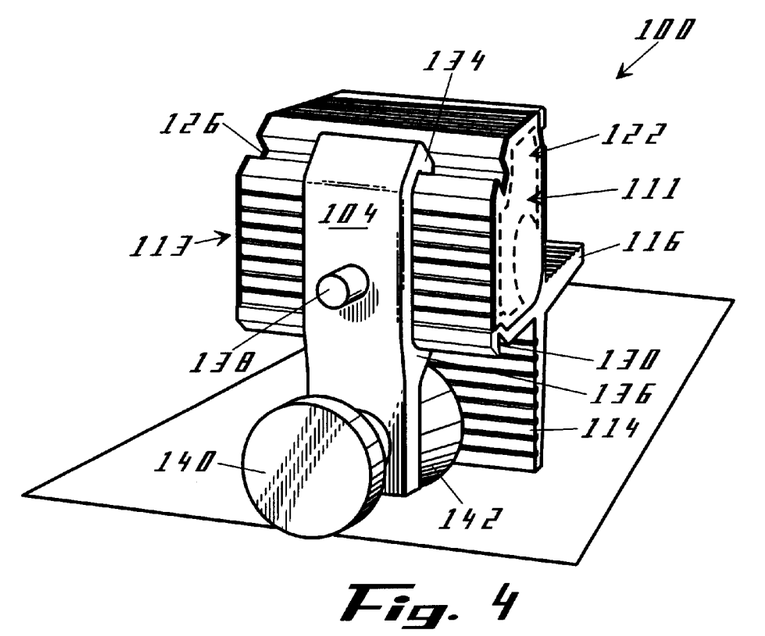
FIG. 4 is a perspective view of the jig oriented for cutting pins in the end of a board for a through dovetail joint.

The guide block 102 can be attached to a board with a C-clamp or other suitable means of attachment. Preferably, however, a repositionable clamp 104 attaches to the guide block 102 to rigidly affix the jig 100 to a board. The repositionable clamp 104 contains a substantially straight body 132 having a first protrusion 134 on one end of the body 132 and a second protrusion 136 located at an intermediate point along the body 132. The guide block 102 has grooves at the three corners of the square tube remote from the orthogonal reference wings 114 and 116. The groove 126 diagonally opposite the reference wings has parallel walls oriented diagonally relative to the four planar sides 106, 108, 110, and 112. The grooves 128 and 130 at the other pair of diagonally opposite corners have groove walls that are parallel to the adjacent reference wing 114 or 116, as the case may be. This permits attachment of the clamp 104, by positioning the protrusions 134 and 136 in the grooves 126, 128, and 130 in two alternative positions. In one position, the top protrusion 134 of the clamp 104 is received in the diagonal groove 126 and the bottom protrusion 136 of the clamp 104 is received in either groove 128 or in groove 130 as illustrated in FIGS. 2 and 4, respectively. Alternatively, grooves, or recesses may be formed in the repositionable clamp 104 to receive protrusions or ridges on the corners of the guide block 102, and other attachment mechanisms could also be used.

Clamp 104 is secured to the guide block 102 by a first locking device 138, which typically is a thumbscrew. Alternatively, the first locking device may be a quick release clamp, a spring-loaded lever, or other suitable mechanism. The guide block 102 is secured to the board by a second locking mechanism 140, which is typically a thumbscrew with a washer 120 attached to its end that has a relatively large surface so to minimize any damage to the face of the board. Alternatively, the second locking mechanism 140 may also be a quick release clamp, or any other appropriate attachment mechanism.

Figure 3:
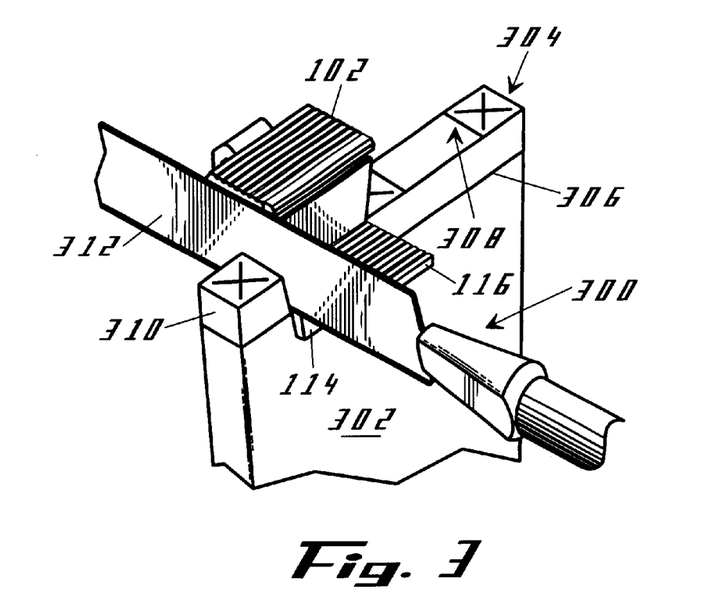
FIG. 3 is a perspective view of the jig positioned on the end of a board for cutting tails for a dovetail joint.

FIGS. 2 through 5 illustrate how the guide block is used to cut tails in a tailboard 300 (FIG. 3) and pins in pinboard 500 (FIG. 5) for forming a dovetail joint. FIGS. 2 and 3 illustrate the guide block 102 positioned in the first orientation on a tailboard 300 to cut the tails of the dovetail joint using a saw 312. The guide block 102 is oriented in the first orientation so that the bottom surface 110 of the guide block 102 is resting on the end 304 of the tailboard 300 and the reference wing 114 is resting against the face 302 of the tailboard 300. This positions the guide block 102 on the tailboard 300, such that the guide faces 111 and 113 form an angle with the end 304 of the tailboard 300 and are square to its face 302. The top protrusion 134 of the repositionable clamp 104 is engaged in the angled slot 126 and the bottom protrusion 136 of the clamp 104 is engaged in slot 128.

Prior to placing the guide block 102 on the tailboard 300, the tailboard 300 and pinboard 500 (FIG. 5) are marked with the layout lines that include a depth line 306 and a series of tail lines 308 on the end of the tailboard 300 that indicate where the tails will be cut and a depth of cut line 506 and a series of pin lines 508 on the pinboard 500 that indicate where the pins will be cut. Because the angle of the dovetail is set by the jig 100, there is no need to lay out the angled cuts of the dovetail joint on the face of the tailboard. The tail lines 308 and pin lines 508 are laid out at the same time by placing the tailboard 300 and pinboard together face-to-face and marking the lines across the end of both boards. This insures that the tail lines 304 and the pin lines 504 line up to produce a tight fitting dovetail joint. Next, depth of cut lines 306 and 506 are placed on the tailboard 300 and the pinboard, respectively. The jig 100 is then placed on the tailboard 300 so that the guide face 111 is lined-up directly on the tail line 308 on the end 304 of the tailboard 300. This causes the friction pad 122 to protrude over the "waste" side 310 of the tail line 304 by the amount of the saw's tooth offset. The "waste" areas 310 are identified in the illustration with an "X." The jig 100 is then secured to the tailboard 300 by tightening the second locking mechanism 140 and clamping the tailboard 300 between the washer 142 of second locking mechanism 134 and the orthogonal wing 114.

Once the guide block 102 is secured to the tailboard 300, a saw 312 is placed proximate to the low-friction pad 122 covering the guide face 111 (in the illustration). The magnet 120 (FIG. 1) inside the guide block 102 engages the saw 312 and ensures that it remains in contact with the guide face 111 while the tails are being cut. The saw 312 is initially positioned on the guide face 111 so that its teeth are positioned below the bottom of the low-friction pad 122, which reduces damage to both the saw blade and the low-friction pad 122.

Figure 5:
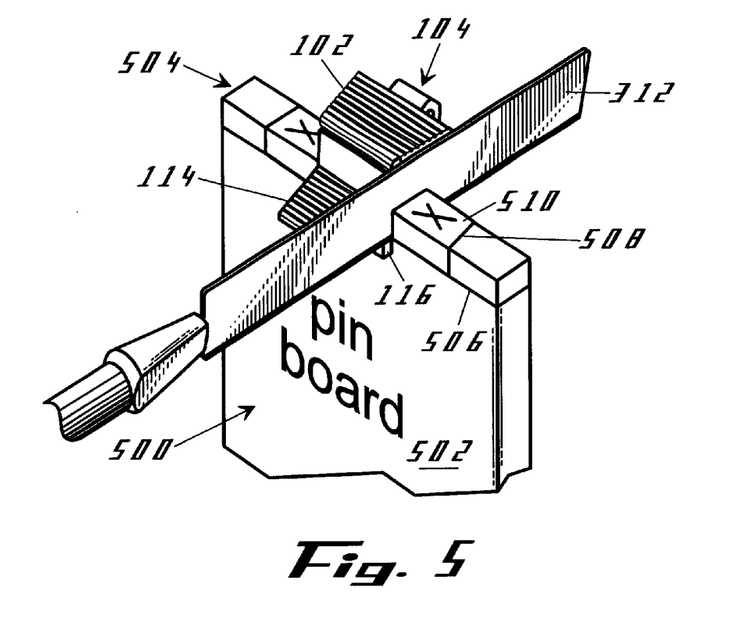
FIG. 5 is a perspective view of the jig being used to guide a saw for cutting pins in the end of a board for a through dovetail joint.

FIGS. 4 and 5 illustrate the jig 100 positioned in the second orientation in order to cut the pins of the dovetail joint on a pinboard 500 and the positioning of the saw 312 in doing so. In this orientation, the surface 108 will be positioned on the end 504 of the pinboard 500, while the reference wing 116 will be flush to the face 502 of the pinboard 500, which will cause the guide faces 111 and 113 to be at an angle with respect to the face 502 of the pinboard 500 and square to the end 504 of the pinboard 500. Also, the top protrusion 134 of the detachable clamp 104 is engaged in the angled guide slot 126, while the bottom protrusion 136 is engaged in the second right angle guide slot 130.

To cut the pins of the dovetail joint, the pinboard 500 is marked with the layout lines, which include a depth line 506 and a series of pin lines 508 on the end 504 of the pinboard 500 that identify where the pins will be cut. The jig 100 is placed on the pinboard 500 so that the guide face 111 is lined-up directly on the pin line 508, which causes the friction pad 122 to protrude over the "waste" side 510 by an amount equal to the tooth offset of the saw 312. The guide block 102 is then secured to the pinboard 500 by tightening the second locking mechanism 140 and clamping the pinboard 500 between the washer 142 and the orthogonal wing 116. The saw 312 is placed proximate the low friction pad 122 covering the guide face 111 or 113, and the pins are cut in the same manner as the tails, described above.

Figure 6:
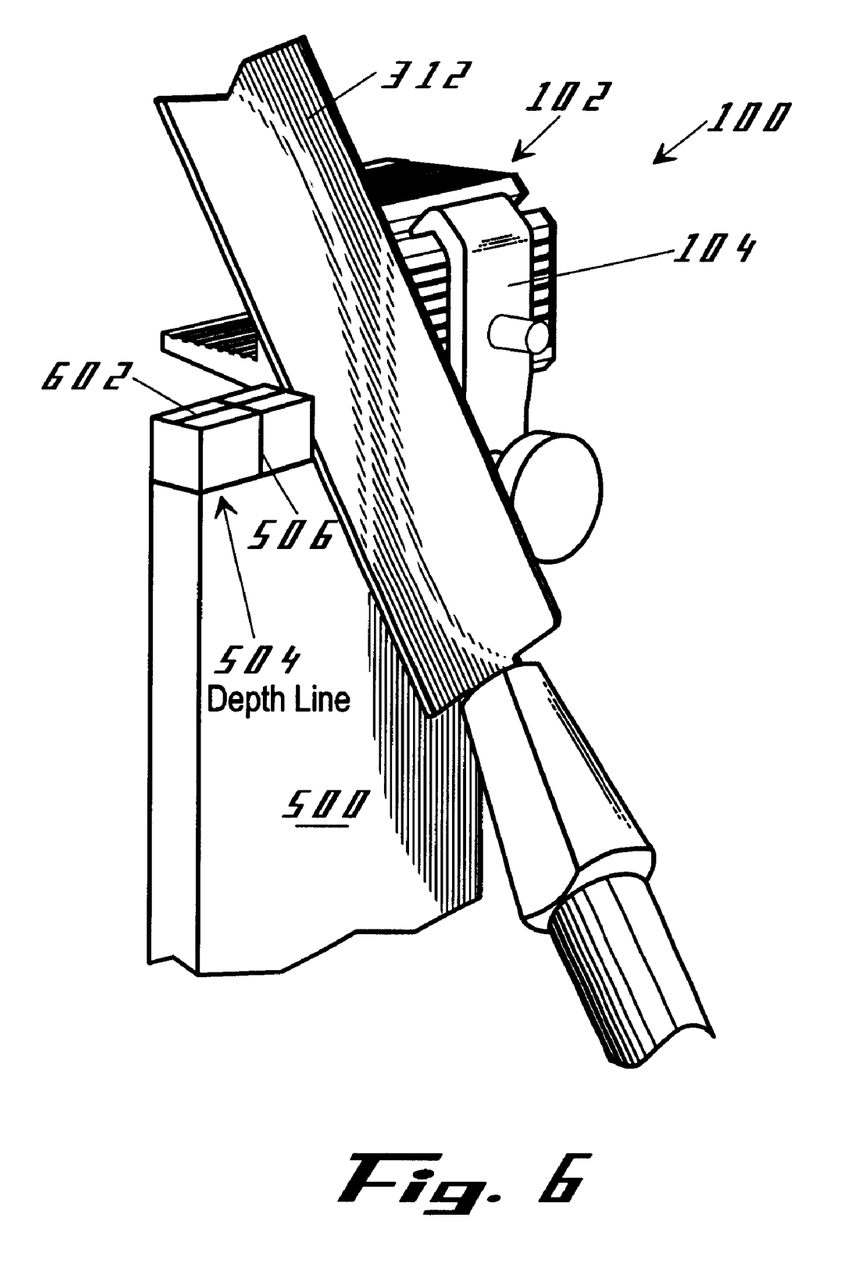
FIG. 6 is a perspective view of the jig being used for cutting pins for a half-blind dovetail joint.

FIG. 6 is an illustration of an exemplary technique for cutting the pins for a half-blind dovetail joint in the pinboard 500 using the jig 100. The procedure is similar to cutting pins for a through dovetail joint with exception that a second depth line 602 is placed on the end 504 of the pinboard 500. To cut the half-blind pin, the saw 312 is positioned at an angle to the end of the pinboard 500 of about 45 degrees. The magnet 120 (FIG. 1) engages the saw 312 and ensures that it maintains contact with the guide face 111 during the entire cut. Since the saw 312 is angled at 45 degrees, the teeth of the saw blade will be in contact with the low friction pad 122. This may result in damage to the low friction pad 122. However, because the low friction pads 122 are made of UHMW polyethylene, the damage will typically be minimal due to the hardness and self-lubricating properties of the material. Therefore the low friction pads 122 can still be used to produce accurate cuts for the through dovetail joints. However, should the pads 122 become damaged through repeated use of the jig 100 to cut half-blind dovetails so that they reduce the accuracy of the cuts, the damaged pads 122 may be replaced with a new set of low-friction pads.

Figure 7A:
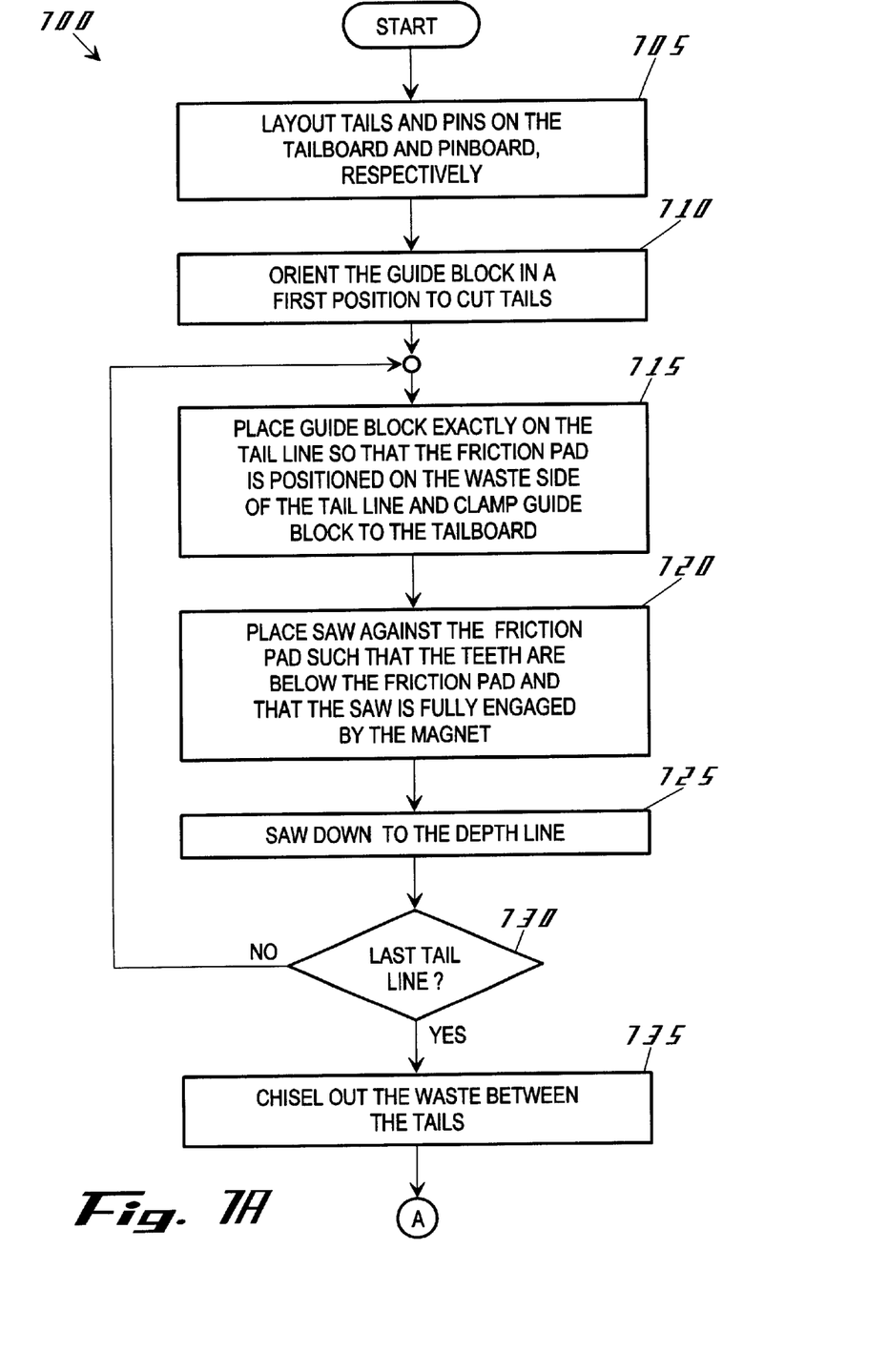
FIGS. 7A and 7B, hereinafter collectively referred to a FIG. 7, are a logic flow diagram illustrating a method for hand cutting through dovetails using the jig.
Figure 7B:
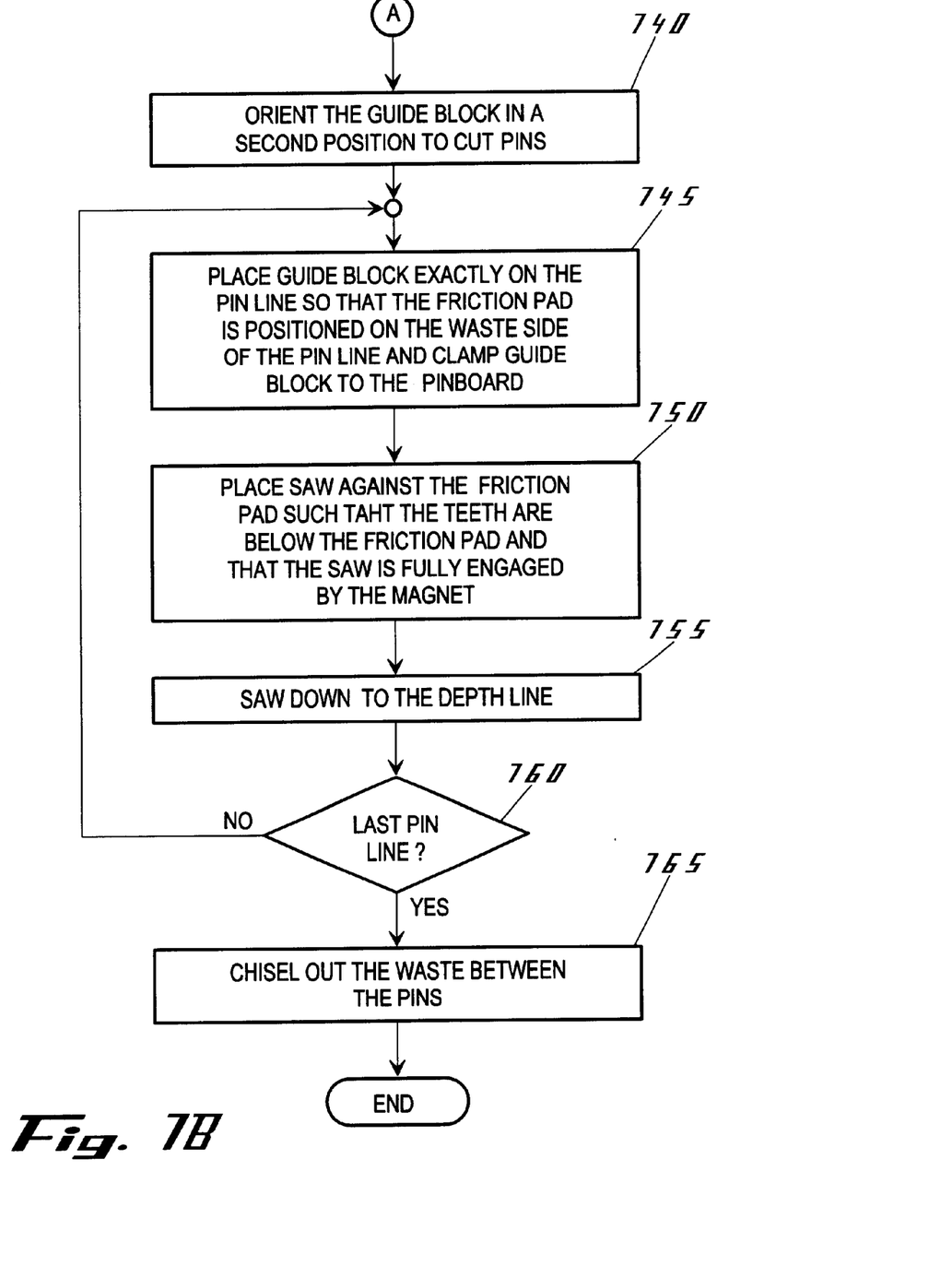

FIG. 7 is a logic flow diagram illustrating an exemplary routine 700 for hand-cutting a dovetail joint using the present invention. Although the following method describes the standard method of cutting the tails first, it should be noted that with the use of the present dovetail guide, it does not matter whether the tails are cut first or the pins are cut first.

Routine 700 begins at step 705, in which a user lays out the tails and pins for the dovetail joint on the tailboard 300 (FIG. 3) and pinboard 500 (FIG. 5), respectively. The tailboard 300 and pinboard 500 are first placed outer face to outer face. Next, a series of marks are made across the ends of both the tailboard 300 and the pinboard 500 identifying the location of the dovetails. The marks do not have to perfectly square across the two boards, since the significant point is where the mark crosses the outer edge of the boards. The dovetail joints may be spaced very evenly if necessary, or randomly, depending on what the final design calls for. However, since the accepted practice is to have a half pin at each end of the pinboard 500, an even number of marks is generally required. Next, a depth line 306, which is equal to the thickness of the pinboard 500 (FIG. 5), is marked on the tailboard 300 to indicate how deep to cut the tails. Similarly, a depth line 506 equal to the thickness of the tailboard 300 is marked on the pinboard 500 to indicate how deep to cut the pins.

Step 705 is followed by step 710, in which the guide block 102 is oriented in a first position to cut the tails of the dovetail joint. The first position orients the guide block 102, such that the angle created by the guide faces 111 and 113 and a vertical plane perpendicular to the end of the tailboard 300.

Step 710 is then followed by step 715, in which the tailboard 300 is clamped in a bench vise and the guide block 102 is placed on the end 304 of the tailboard 300 to cut the tails. The guide face 111 should be placed exactly on the first tail mark 308 (FIG. 3), which causes the low-friction pad 122 (FIG. 1) to protrude over the waste area 306. Typically, the low-friction pad 122 stands proud of the guide block 102 by no more than the thickness of the tooth offset of the saw 312 used to make the dovetail joints. Usually, the thinner the kerf of the saw blade the more accurate the dovetail joint will be. Therefore, a fine tooth saw, preferably a Dozuki-style saw, which has teeth that are set no more than, for instance, 0.005 inches on each side, may be used with the jig 100. Consequently, the low-friction pads 122 can stand proud of the guide block face by the amount of the tooth set (e.g., 0.005 inches) or by slightly more that the amount of the tooth set of the saw. This insures that the cut will fall exactly on the tail line, thereby allowing for extremely accurate cuts and providing a significant advantage over existing prior art dovetail guides.

Next, the guide block 102 is secured to the tailboard 300 by engaging the repositionable clamp 104 so that the tailboard 300 is held firmly between the clamp washer 142 and the support surface 114. The clamp pad 142 may be adjusted using the thumbscrew 140 (FIG. 1) to securely affix the guide block 102 to the tailboard 300. Step 715 is then followed by step 720, in which the saw 312 is placed against low-friction pad 122, ensuring that the teeth of the saw are below the level the low-friction pads 122. The magnet 120 embedded within the cavity of the guide block 102 engages the saw 312 and ensures that the saw 312 is fully registered against the low-friction pad 122.

Step 720 is then followed by step 725, in which the user cuts down to the depth line 302. The magnet 120 insures that the saw 312 remains fully engaged with the low-friction pad 122 during the entire cut. After the cut is completed, the determination is made at step 730 whether the jig 100 was positioned on the last tail line. If the determination is made that the there are other tail marks, the "NO" branch is followed to step 715 and the guide block is moved to the next tail mark and the process is repeated. If, however, the last tail line was cut, the "YES" branch is followed to step 735, in which the waste between adjacent tails is removed with a chisel or other appropriate tool.

Step 735 is followed by step 740, in which the guide block 102 is oriented in a second position to cut the pins for the dovetail joint. The guide block 102 is oriented in such a manner that the guide face 111 is positioned at an angle to the face of the pinboard and square to the end of the pinboard.

Next, step 740 is followed by step 745, in which pinboard 500 is clamped in a bench vise and the guide block 102 is positioned exactly on the first pin mark such that the low friction pad is positioned on the waste side of the pin line. Once the guide block 102 is appropriately positioned, it is clamped to the pinboard 500.

Step 745 is followed by step 750, in which the saw blade 312 is placed against the friction pad 122 and fully engaged by the magnet 120. Step 750 is then followed by step 755, where the user saws down to the depth line. Next, step 755 is followed by step 760, in which the determination is made whether the last pin line has been cut. If the determination is made that the last pin line has not been cut, routine 700 loops back along the "NO" branch to step 745, where the guide block 102 is positioned on the next pin line and the procedure is repeated until all the pins have been cut. Once all the pins have been cut, the "YES" branch is followed to step 765, in which the waste between adjacent pins is removed with a chisel or other appropriate tool.

In some instances when cutting the half pins at each end of the pinboard, the half pins may not provide enough support for the guide block 102. In these cases, an additional board that is the same thickness as the pinboard may be butted against the pinboard to provide additional support to keep the guide block 102 secure while cutting the half pin.

It should be understood that the foregoing pertains only to the preferred embodiments of the present invention, and that numerous changes may be made to the embodiments described herein without departing from the spirit and scope of the invention. For instance, alternative structures and materials could be used for all of the components. The guide block 102 and repositionable clamp could be manufactured from metals other than aluminum or from plastic or reinforced plastic materials. Additionally, the guide body 103 formed by sides 106, 108, 110, and 112 can be generally hollow as shown in the figures, or could be a solid or substantially solid structure and could have different cross section shapes, such as that of a round rod or tube, provided that the guide surfaces against which a saw 312 can slide are present and appropriately oriented relative to reference surfaces that contact the work piece. Similarly, alternative polymer materials known under the common names of Nylon®, Phenolic, Acetal, Teflon®, and the like could be use for the low friction pads 122, as could yet-to be developed materials having appropriate properties.

I claim:

1. A jig for use with a saw for cutting wood having at least one end and one adjacent face, the jig comprising:
    a pair of orthogonal support surfaces for contact with the wood, and,
    attached to the support surfaces, a guide body having at least one end that provides a guide face oriented square to one of the support surfaces and at an oblique angle to the other of the support surfaces.

2. The jig of claim 1, wherein the guide body has a second end that provides a second guide face oriented square to one of the support surfaces and at an oblique angle to the other of the support surfaces.

3. The jig of claim 2, further comprising a low friction pad attached to each of the two guide body ends.

4. The jig of claim 3, further comprising a repositionable clamp for securing the jig alternatively: (a) with one of the support surfaces in contact with the wood end and the other of the support surfaces in contact with the wood face; or (b) with one support surface in contact with the wood face and the other support surface in contact with the wood end.

5. The jig of claim 1, further comprising a magnet secured within the guide body to urge the saw into contact with the guide face.

6. The jig of claim 2, further comprising two magnets secured within the guide body, one of which magnets is positioned to urge the saw into contact with one of the guide faces, and the other of which magnets is positioned to urge the saw into contact with the other one of the guide faces.

7. The jig of claim 3, further comprising two magnets secured within the guide body, one of which magnets is positioned to urge the saw into contact with one of the guide faces, and the other of which magnets is positioned to urge the saw into contact with the other one of the guide faces.

8. The jig of claim 4, further comprising two magnets secured within the guide body, one of which magnets is positioned to urge the saw into contact with one of the guide faces, and the other of which magnets is positioned to urge the saw into contact with the other one of the guide faces.

9. The jig of claim 8, wherein the guide body has three recesses and the clamp comprises:
    two protrusions, one of which is received in one of the three recesses and the other of which protrusions is alternatively received in the second or third of the three recesses;
    a locking mechanism for attaching the repositionable clamp to the guide body; and a clamping mechanism for exerting pressure opposite one or the other of the orthogonal support surfaces for attaching the guide block to the end of the wood.

10. The jig of claim 8, wherein the guide body further comprises first, second and third guide body engagement structures and the clamp comprises:

two clamp engagement structures that engage, alternatively: (a) the first guide body engagement structure and the second guide body engagement structure or (b) the first guide body engagement structures and the third guide body engagement structure;

a locking mechanism for attaching the repositionable clamp to the guide body; and a clamping mechanism for exerting pressure opposite one or the other of the orthogonal support surfaces for attaching the guide block to the end of the wood.

11. The jig of claim 1, wherein the guide body comprises a segment of extruded aluminum.

12. The jig of claim 1, wherein the guide body comprises plastic.

13. The jig of claim 2, wherein the ends of the guide body are symmetrical to one another.

14. The jig of claim 2, wherein the low-friction pads are positioned in a recess formed in each end of the guide body.

15. The jig of claim 14, wherein the low-friction pads are attached to each end of the guide body by adhesive.

16. The jig of claim 3, wherein the low friction pads stand proud of the ends of the guide body by a predetermined distance.

17. The jig of claim 16, where in the predetermined distance is about 0.005 inches.

18. The jig of claim 17, wherein the saw is a Dozuki-style saw with a tooth offset of about 0.005 inches.

19. The jig of claim 3, wherein the low friction pad comprises a material selected from the group consisting of UHMW polyethylene and polytetrafluroethylene.

20. The jig of claim 4, wherein the repositionable clamp comprises extruded aluminum.

21. The jig of claim 4, where in the repositionable clamp comprises plastic.

22. A jig for cutting a dovetail joint having tails and pins, comprising:

a guide block comprising:

a guide body having two ends;

guide faces on opposite sides of the guide body, the guide body positionable against an end of a board having an adjacent board face with the guide faces alternatively: (a) square to the end of the board and oblique to the adjacent board face, or (b) square to the board face and oblique to the end; and at least one magnet mounted in the guide body to keep the saw engaged with at least one of the guide faces.

23. The jig of claim 22, further comprising a repositionable clamp attachable to the guide block for securing the jig to the end of the board.

24. The jig of claim 22, further comprising a pair of orthogonal support surfaces connected to one corner of the guide block for supporting the guide block against the end and face of the board.

25. The jig of claim 23, wherein the guide block further comprises:

an arcuate channel attached to the interior of the guide block adjacent to the corner bearing the orthogonal support surfaces, wherein the arcuate channel is operative for receiving the magnets.

26. The jig of claim 25, wherein the magnets are attached to the arcuate channel using adhesive.

27. A jig for producing repeatable, accurate cuts in a board with a hand saw having a predetermined tooth offset, comprising:

a guide block having a guide face on each end of the guide block; and a replaceable low-friction pad covering a portion of the guide face, wherein the low friction pad stands proud of the guide face by an amount approximately equal to the predetermined tooth offset of the hand saw.

28. The jig of claim 27, further comprising a magnet underlying the low-friction pad to draw the hand saw against the guide face.

29. The jig of claim 27, wherein the guide face are positioned such that the guide faces are square to an end of the board and at an angle to a face of the board when the guide block is oriented in a first position, and at an angle to the end of the board and square to the face when the guide block is oriented in a second position.

30. The jig of claim 27, wherein the low-friction pad is mounted in a recess formed in each end of guide block.

31. The jig of claim 30, wherein the low-friction pad is secured by adhesive.

32. The jig of claim 28, wherein the low-friction pad comprises UHMW polyethylene.

33. The jig of claim 28, wherein the guide block further comprises:

an arcuate channel positioned within the guide block for receiving the magnets, so that each magnets lies flush with or slightly below each guide face.

34. The jig of claim 33, wherein the guide block is made from a segment of extruded aluminum.

35. The jig of claim 28, wherein the tooth offset of the saw blade is about 0.005 inches.

36. A method for hand-cutting a plurality of tails and a plurality of pins to form a dovetail joint using a guide block and a hand saw, the guide block comprising a pair of symmetrically angled guide faces, a magnet for drawing the hand saw against each angled guide face, and a low friction pad covering the guide face, comprising:

(a) laying out the plurality of tails on a tailboard and the plurality of pins on a pinboard;

(b) orienting the guide block in a first position on the tailboard to cut the tails;

(c) placing the guide face of the guide block on the first tail line so that the friction pad is positioned on a waste side of the tail line;

(d) placing a saw against the friction pad such that the teeth are below the friction pad and the magnet engages the saw;

(e) sawing to the depth line;

(f) repeating step (a)–(e) for each tail line;

(g) removing the waste between the tails;

(h) orienting the guide block in a second position on the pinboard to cut the pins; and (i) repeating steps (a)–(g) for cutting the pins.

37. The method of claim 36, wherein the low friction pads stand proud of the guide face by a predetermined distance approximately equal to the tooth offset of the saw.

38. The method of claim 36, wherein the step of laying out the plurality of pins and the plurality of tails comprises:

placing the pinboard and tailboard face to face and making a cut line across the end of both the pinboard and tailboard;

marking a depth of cut line on the pinboard and the tailboard; and marking the waste basket areas between the pins and he tails on the end of the pinboard and tailbord, respectively.

39. The method of claim 36, wherein the saw the Dozuki-style seen with a tooth offset of about 0.005 inches.

40. The method of claim 36, wherein the low friction pad comprises UHMW polyethyle.

* * * * *